(12) United States Patent
Mitelman et al.

(10) Patent No.: US 11,182,476 B2
(45) Date of Patent: Nov. 23, 2021

(54) ENHANCED INTELLIGENCE FOR A SECURITY INFORMATION SHARING PLATFORM

(71) Applicant: HEWLETT PACKARD ENTERPRISE DEVELOPMENT LP, Houston, TX (US)

(72) Inventors: Tamir Mitelman, Yehud (IL); Meytal Maor, Yehud (IL); Ofer Bachner, Yehud (IL); Amir Kibbar, Livermore, CA (US)

(73) Assignee: Micro Focus LLC, Santa Clara, CA (US)

( * ) Notice: Subject to any disclaimer, the term of this patent is extended or adjusted under 35 U.S.C. 154(b) by 1132 days.

(21) Appl. No.: 15/258,784

(22) Filed: Sep. 7, 2016

(65) Prior Publication Data
US 2018/0068119 A1 Mar. 8, 2018

(51) Int. Cl.
*G06F 21/55* (2013.01)

(52) U.S. Cl.
CPC .......... *G06F 21/552* (2013.01); *G06F 21/554* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 7,836,133 B2 * | 11/2010 | Quinlan | ................ | H04L 63/126 709/206 |
| 7,899,901 B1 * | 3/2011 | Njemanze | ............. | G06F 21/552 709/224 |
| 8,490,163 B1 * | 7/2013 | Harsell | ............... | G06F 21/6236 726/6 |
| 8,813,236 B1 * | 8/2014 | Saha | ................... | H04L 63/1408 726/25 |
| 9,015,794 B2 * | 4/2015 | Ponchel | ................. | G06F 21/50 726/1 |
| 9,350,762 B2 * | 5/2016 | Doddapaneni | ...... | H04L 63/1416 |
| 9,386,041 B2 * | 7/2016 | Carver | ............... | H04L 63/1416 |
| 9,565,213 B2 * | 2/2017 | Rogers | ............... | H04L 63/0236 |
| 9,654,485 B1 * | 5/2017 | Neumann | .......... | H04L 63/1441 |
| 2003/0051026 A1 * | 3/2003 | Carter | .................... | H04L 41/00 709/224 |
| 2010/0192226 A1 * | 7/2010 | Noel | ................... | H04L 63/1425 726/23 |

(Continued)

OTHER PUBLICATIONS

"Palantir Cyber, An End-to-End Cyber Intelligence Platform for Analysis & Knowledge Management," Palantir Technologies, 2013, 9 pps.

*Primary Examiner* — Badri Narayanan Champakesan

(57) ABSTRACT

Examples disclosed herein relate to providing enhanced threat intelligence on a security information sharing platform. Some examples may enable correlating a first set of items of threat information from the security information sharing platform. Some examples may enable, responsive to determining that the correlated first set of items of threat information indicate a first malicious action type, creating a new security indicator comprising information from the correlated first set of items of threat information and associating the new security indicator with the first malicious action type. Some examples may enable determining whether a first threat pattern exists based on the new security indicator.

20 Claims, 5 Drawing Sheets

(56) References Cited

U.S. PATENT DOCUMENTS

| | | | | |
|---|---|---|---|---|
| 2013/0117812 A1* | 5/2013 | Ponchel | ............... | G06F 21/577 |
| | | | | 726/1 |
| 2013/0298192 A1* | 11/2013 | Kumar | ................... | G06F 21/52 |
| | | | | 726/3 |
| 2014/0082730 A1* | 3/2014 | Vashist | ................... | H04L 67/22 |
| | | | | 726/23 |
| 2015/0128274 A1* | 5/2015 | Giokas | ................ | H04L 63/1425 |
| | | | | 726/23 |
| 2015/0150125 A1* | 5/2015 | Dulkin | ................... | H04L 63/20 |
| | | | | 726/22 |
| 2015/0215334 A1* | 7/2015 | Bingham | ............ | H04L 63/1425 |
| | | | | 726/23 |
| 2016/0212169 A1* | 7/2016 | Knjazihhin | ............. | H04L 63/20 |
| 2016/0301704 A1* | 10/2016 | Hassanzadeh | ...... | H04L 63/1433 |
| 2017/0041329 A1* | 2/2017 | Gobel | ..................... | H04L 67/12 |
| 2017/0063917 A1* | 3/2017 | Chesla | ................... | H04L 63/20 |
| 2017/0099313 A1* | 4/2017 | Singuru | ............. | G06F 9/45558 |
| 2017/0103218 A1* | 4/2017 | Bray | ..................... | G06F 21/604 |
| 2017/0171235 A1* | 6/2017 | Mulchandani | ...... | H04L 63/1433 |
| 2017/0187733 A1* | 6/2017 | Ahn | ........................ | H04L 63/20 |
| 2017/0187741 A1* | 6/2017 | Desch | ................ | H04L 63/1433 |
| 2017/0237752 A1* | 8/2017 | Ganguly | ............ | H04L 63/1433 |
| | | | | 726/25 |
| 2017/0279836 A1* | 9/2017 | Vasseur | .................. | G06N 20/00 |
| 2017/0346834 A1* | 11/2017 | Shaikh | ................ | H04L 63/1416 |
| 2017/0365027 A1* | 12/2017 | Hein | ....................... | G06F 16/29 |
| 2018/0091542 A1* | 3/2018 | Bachner | ................. | H04L 63/20 |

\* cited by examiner

ENHANCED INTELLIGENCE FOR A SECURITY INFORMATION SHARING PLATFORM

BACKGROUND

Users of a security information sharing platform share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users.

BRIEF DESCRIPTION OF THE DRAWINGS

The following detailed description references the drawings, wherein.

DETAILED DESCRIPTION

Figure 1:
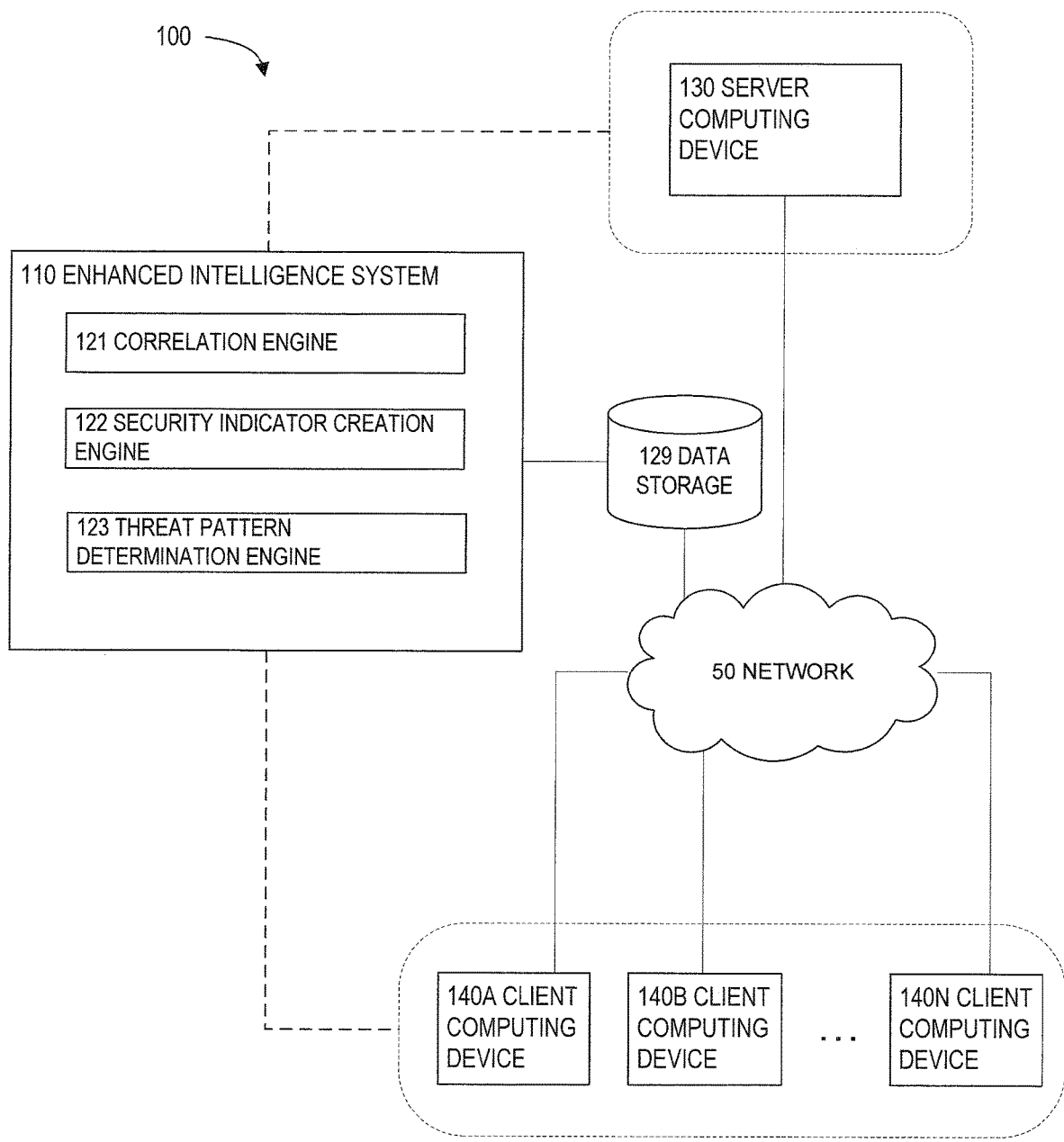
FIG. 1 is a block diagram depicting an example environment in which various examples may be implemented as a security information sharing platform that provides enhanced intelligence.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Users of a security information sharing platform share security indicators, security alerts, and/or other security-related information (e.g., incidents, mitigations strategies, attackers, attack campaigns and trends, threat intelligence information, etc.) with other users in an effort to advise the other users of any security threats, or to gain information related to security threats from other users. In addition to intelligence received by members, the security information sharing platform may also import threat intelligence from various threat feeds.

The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus.

Numerous issues exist with using the large amount of threat intelligence gathered from these numerous sources. Existing technologies may be able to intake threat intelligence from various sources and correlate existing data, but fail to leverage existing threat intelligence to create new threat intelligence.

This disclosure provides a technical solution to this technical challenge by facilitating the correlation of threat intelligence from these various sources to create new security indicators that fit into a pattern of behavior that may or may not be malicious. By determining how the correlated threat intelligence and the newly created indicators fit a pattern, the security information sharing platform may determine whether the underlying threat intelligence is associated with a malicious threat or with benign/expected behavior.

Since security indicators can be easily created and/or added by various users using the security information sharing platform, there may be a risk that a certain security indicator is erroneously classified (e.g., as non-malicious that poses an actual security threat, or as malicious but does not pose an actual security threat). For example, if a popular news site that is actually benign and not malicious is included as an observable in a security indicator, the site can be blocked, causing inconvenience to the users and/or communities. Moreover, this may cause erroneous security alerts to be generated, contaminating the data being shared and continuously being re-shared in the security information sharing environment. It may also cause issues for communities or users that may want to share security indicators.

Examples disclosed herein provide technical solutions to these technical challenges by providing enhanced threat intelligence on a security information sharing platform. Some examples may enable correlating a first set of items of threat information from the security information sharing platform. Some examples may enable, responsive to determining that the correlated first set of items of threat information indicate a first malicious action type, creating a new security indicator comprising information from the correlated first set of items of threat information and associating the new security indicator with the first malicious action type. Some examples may enable determining whether a first threat pattern exists based on the new security indicator.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as an enhanced intelligence system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, enhanced intelligence system 110 and the various components described herein may be implemented in hardware and/or a combination of hardware and programming that configures hardware. Furthermore, in FIG. 1 and other Figures described herein, different numbers of components or entities than depicted may be used.

Enhanced intelligence system 110 may comprise a security information sharing platform that allows users to share security indicators, security alerts, and/or other security-related information (e.g., incidents, mitigations strategies, attackers, attack campaigns and trends, threat intelligence information, etc.) with other users in an effort to advise the other users of any security threats, or to gain information related to security threats from other users. A user may, for example, interact with the security information sharing platform of enhanced intelligence system 110 via a client computing device 140n.

The users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected user.

A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus.

Enhanced intelligence system 110 may also comprise a correlation engine 121, a security indicator creation engine 122, a threat pattern determination engine 123, and/or other engines. The term "engine", as used herein, refers to a combination of hardware and programming that performs a designated function. As is illustrated with respect to FIGS. 3-4, the hardware of each engine, for example, may include one or both of a physical processor and a machine-readable storage medium, while the programming is instructions or code stored on the machine-readable storage medium and executable by the processor to perform the designated function.

Correlation engine 121 may correlate a first set of items of threat information from the security information sharing platform. For example, the correlation engine 121 may correlate a first set of items of threat information based on linkages between the items of threat information. The linkages may be based on information in a security indicator in the first set of items, may be based on a set of common characteristics shared between one or more subsets of the first set of items, and/or may be otherwise determined. The common characteristics may comprise, for example, a user, author, time span, URL, and/or other characteristic. In some examples, the correlation engine 121 may correlate a random set of items of threat intelligence as a first set of items.

Security indicator creation engine 122 may determine that the correlated first set of items of threat information indicate a first malicious action type. The enhanced intelligence system 110 may store a set of action types. Each action type may comprise an identifier, an indicator if the action type is malicious or not malicious, a set of information associated with the action type, an identification of an associated security indicator, a potential threat pattern identification associated with the action types, information about a set of related action types, and/or other information related to the action type. The set of information associated with the action type may comprise a set of security indicators, or information from general threat intelligence.

In some examples, each action type may be associated with a threat pattern. A threat pattern may indicate that a potential threat is occurring based on information gathered via the security information sharing platform. A threat pattern may comprise, for example, a threat pattern identifier, a set of security indicators associated with the threat pattern, a potential order of the set of security indicators, information about remediation for the potential threat, and/or other information related to the threat pattern.

The set of action types and/or the set of threat patterns may be received from an administrator of the security information sharing platform via the enhanced intelligence system 119, may be obtained from storage communicably coupled to the enhanced intelligence system 110, may be customized and/or machine-learned, and/or other may be otherwise obtained. New action types with new associated security indicators and/or new threat patterns with associated respective sets of security indicators may be received from administrators or users, may be machine-learned, and/or otherwise may be added in the set of action types. The received and new sets of action types and/or threat patterns may be stored, for example, in data storage 129.

The security indicator creation engine 122 may determine that the correlated first set of items of threat information are associated with an action type of the set of action types by comparing the information associated with the action type to the correlated first set of items of threat information. Responsive to the two types of information matching for a first action type, the security indicator engine 122 may determine that the correlated first set of items of threat information indicate the first action type. Responsive to the first action type being a malicious action type (e.g., the action type has an indicator that the first action type is malicious), the security indicator engine 122 may determine that the correlated first set of items of threat information indicate the first malicious action type.

Responsive to determining that the correlated first set of items of threat information indicate a first malicious action type, security indicator engine 122 may create a new security indicator comprising information from the correlated first set of items of threat information. The new security indicator may comprise the security indicator identifier from the first action type and the information from the correlated first set of items of threat intelligence that matched the information associated with the first action item. In some examples, the new security indicator may comprise the correlated first set of items of threat intelligence. Security indicator creation engine 122 may associate the new security indicator with the first malicious action type.

For example, security indicator engine 122 may create a new scanning host reconnaissance indicator responsive to determining that the correlated first set of items of threat intelligence indicate a reconnaissance action type (e.g., that several indicators show the same IP address with different attack ports). In another example, the security indicator engine 122 may create a new advanced persistent threat ("APT") infiltration security indicator responsive to determining that the correlated first set of items of threat intelligence indicate infiltration (e.g., the same IP address first participates in reconnaissance then malware is downloaded from the IP address). In yet another example, the security indicator engine 122 may create a new APT exfiltration security indicator responsive to determining that the correlated first set of items of threat intelligence indicate exfiltration (e.g., the same IP address first participates in infiltration, then malware sends information to a domain). In another example, the security indicator engine 122 may create a new phishing security indicator responsive to determining that the correlated first set of items of threat intelligence indicate phishing (e.g., an IP address is linked to an email message with a phishing attempt).

In some examples where the action item has an indicator that it is not malicious, the security indicator engine 122 may create a whitelist indicator. For example, responsive to determining that the correlated first set of items of threat information do not indicate any malicious action type of a set of malicious action types, the security indicator engine 122 may create a new whitelist indicator comprising information from the correlated first set of items of threat information and may associate the new whitelist indicator with a whitelist action type.

For example, security indicator engine 122 may create a new content delivery network indicator responsive to determining that the correlated first set of items of threat intelligence indicate a content delivery network type (e.g., that several URLS point to files stored on the same domain, and the host IP addresses are correlated to known content delivery networks). In another example, security indicator engine 122 may create a new scanning popular website indicator responsive to determining that the correlated first set of items of threat intelligence indicate a popular website action type (e.g., many communication attempts are made by multiple customers to the same website).

In some examples, the security indicator engine 122 may determine that action types may be linked to actors (e.g., indicating that the same actor is correlated to different activities in the system), shared hosts (e.g., indicating that a specific IP address is from a shared host known to be benign or malicious), shared servers, etc. Security indicator engine 122 may create additional security indicators based on the determined links. The additional created security indicators may be stored, for example, in data storage 129.

The security indicators that are created and the links that are determined are merely exemplary and are in no way limiting on the types of security indicators or links that may be used by the enhanced intelligence system 110.

Threat pattern determination engine 123 may determine whether a threat pattern exists based on the new security indicator. In some examples, the threat pattern determination engine 123 may determine whether the security information sharing platform has access to a related set of security indicators, where each security indicator in the related set of security indicators matches a corresponding indicator in the first threat pattern set of security indicators. The threat pattern determination engine 123 may determine whether the security information sharing platform has access to the related set of security indicators via information shared by users, via security indicators stored in data storage 129, and/or by other manners of accessing security indicators.

In some examples, the threat pattern determination engine 123 may provide an alert regarding the threat pattern via the security information sharing platform (e.g., to a set of users that provide the correlated first set of items of threat intelligence, to an administrator, and/or to another entity). In some examples, the the threat pattern determination engine 123 may determine whether a remediation action is associated with the threat pattern, and may perform the remediation pattern responsive to determining that the threat pattern exists.

In performing their respective functions, engines 121-123 may access data storage 129 and/or other suitable database(s). Data storage 129 may represent any memory accessible to enhanced intelligence system 110 that can be used to store and retrieve data including, but not limited to, security indicators, action types, threat patterns, user data, and/or other data related to the security information sharing platform. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Enhanced intelligence system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
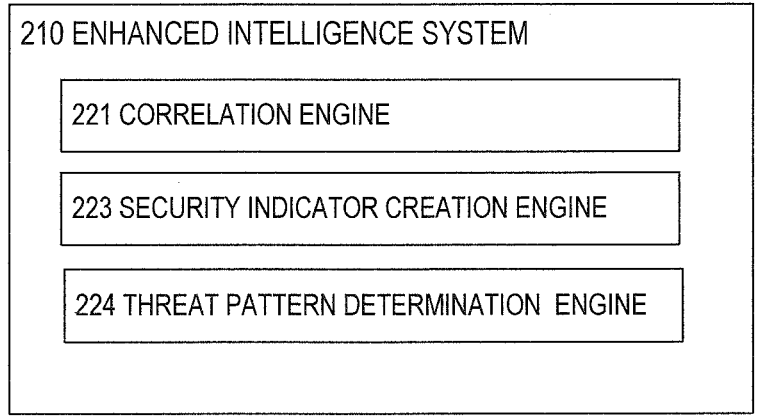
FIG. 2 is a block diagram depicting an example security information sharing platform that provides enhanced intelligence.

FIG. 2 is a block diagram depicting an example enhanced intelligence system 210. Enhanced intelligence system 210 may comprise a correlation engine 221, a security indicator creation engine 222, a threat pattern determination engine 223, and/or other engines. Engines 221-223 represent engines 121-123, respectively.

Figure 3:
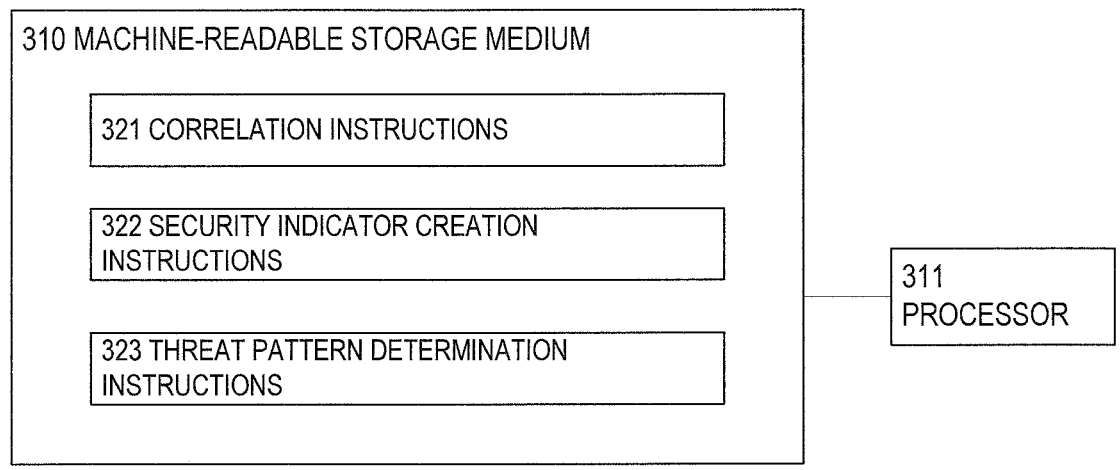
FIG. 3 is a block diagram depicting an example machine-readable storage medium comprising instructions executable by a processor for providing enhanced intelligence on a security information sharing platform.

FIG. 3 is a block diagram depicting an example machine-readable storage medium 310 comprising instructions executable by a processor for providing enhanced intelligence in a security information sharing platform.

In the foregoing discussion, engines 121-123 were described as combinations of hardware and programming. Engines 121-123 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements enhanced intelligence system 110 of FIG. 1.

In FIG. 3, the executable program instructions in machine-readable storage medium 310 are depicted as correlation instructions 321, security indicator creation instructions 322, and threat pattern determination instructions 323. Instructions 321-323 represent program instructions that, when executed, cause processor 311 to implement engines 121-123, respectively.

Figure 4:
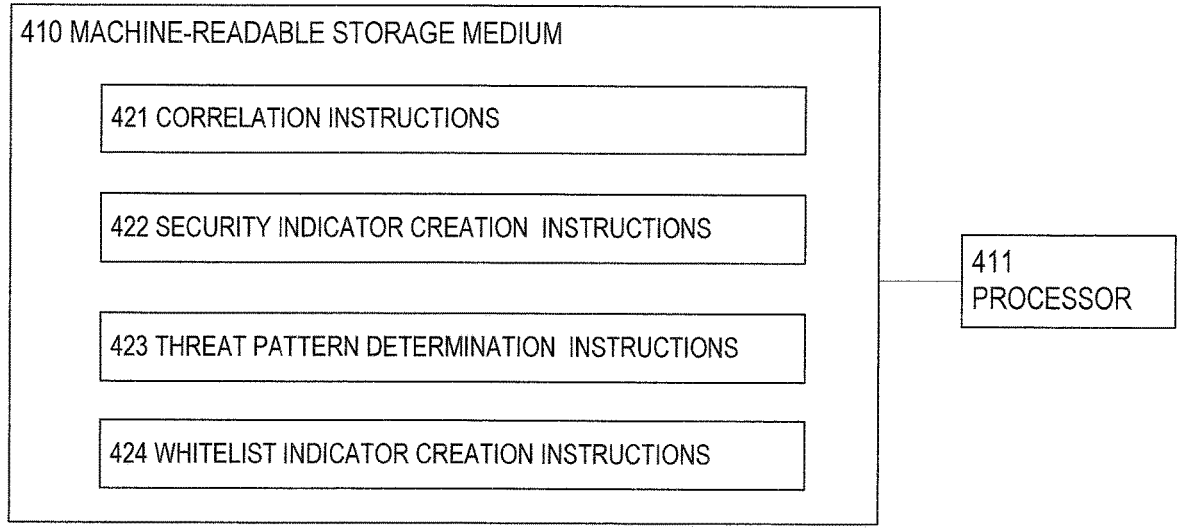
FIG. 4 is a block diagram depicting an example machine-readable storage medium comprising instructions executable by a processor for providing enhanced intelligence on a security information sharing platform.

FIG. 4 is a block diagram depicting an example machine-readable storage medium 410 comprising instructions executable by a processor for providing enhanced intelligence in a security information sharing platform.

In the foregoing discussion, engines 121-123 were described as combinations of hardware and programming. Engines 121-123 may be implemented in a number of fashions. Referring to FIG. 4, the programming may be processor executable instructions 421-424 stored on a machine-readable storage medium 410 and the hardware may include a processor 411 for executing those instructions. Thus, machine-readable storage medium 410 can be said to store program instructions or code that when executed by processor 411 implements enhanced intelligence system 110 of FIG. 1.

In FIG. 4, the executable program instructions in machine-readable storage medium 410 are depicted as correlation instructions 421, security indicator creation instructions 422, threat pattern determination instructions 423, and whitelist indicator creation instructions 424.

Correlation instructions 421, when executed, cause processor 411 to correlate a first set of items of threat information from the security information sharing platform. In some examples, correlation instructions 421 represent program instructions that, when executed, cause processor 411 to implement some or all of correlation engine 121.

Security indicator creation instructions 422, when executed, cause processor 411 to, responsive to determining that the correlated first set of items of threat information indicate a first malicious action type, create a new security indicator comprising information from the correlated first set of items of threat information and associate the new security indicator with the first malicious action type. In some examples, security indicator creation instructions 422 represent program instructions that, when executed, cause processor 411 to implement at least some of security indicator creation engine 122.

Threat pattern determination instructions 423, when executed, cause processor 411 to determine whether a first threat pattern exists based on the new threat. In some examples, threat pattern determination instructions 423 represent program instructions that, when executed, cause processor 411 to implement some or all of threat pattern determination engine 123.

Whitelist indicator creation instructions 424, when executed, cause processor 411 to create a new whitelist indicator comprising information from the correlated first set of items of threat information responsive to determining that the correlated first set of items of threat information do not indicate any malicious action type of a set of malicious action types. Whitelist indicator creation instructions 424, when executed, may also cause processor 411 to associate the new whitelist indicator with a whitelist action type. In some examples, indicator display instructions 424 represent program instructions that, when executed, cause processor 411 to implement at least some of security indicator creation engine 122.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement enhanced intelligence system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-323, and/or other instructions. As an alternative or in addition to retrieving and executing instructions, processor 311 may include at least one electronic circuit comprising a number of electronic components for performing the functionality of at least one of instructions 321-323, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-424, and/or other instructions. As an alternative or in addition to retrieving and executing instructions, processor 411 may include at least one electronic circuit comprising a number of electronic components for performing the functionality of at least one of instructions 421-424, and/or other instructions.

Figure 5:
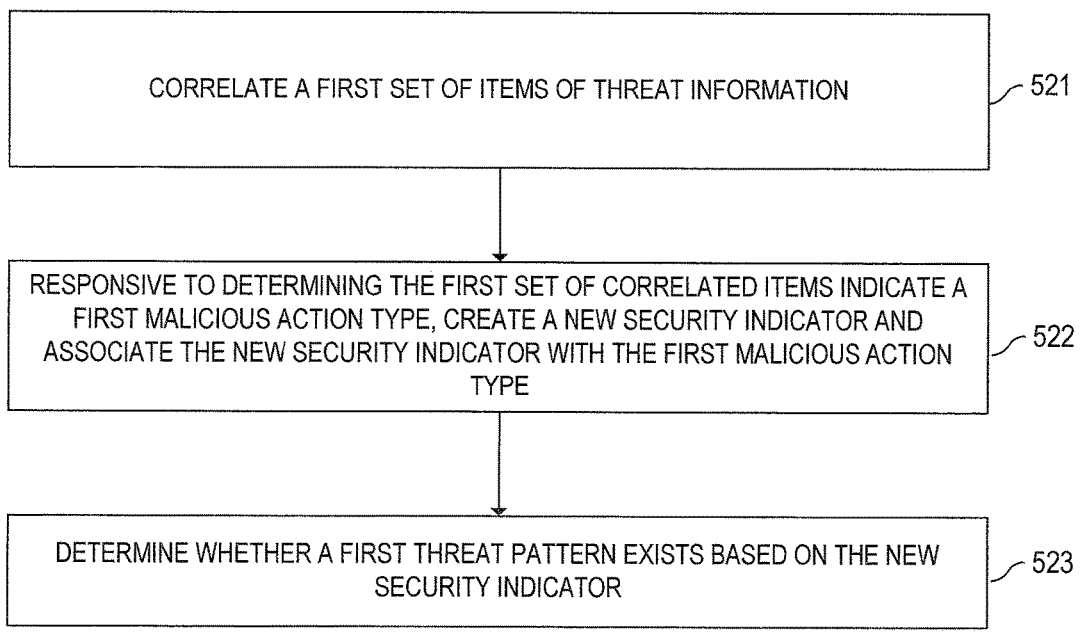
FIG. 5 is a flow diagram depicting an example method for providing enhanced intelligence on a security information sharing platform.

FIG. 5 is a flow diagram depicting an example method 500 for providing enhanced intelligence in a security information sharing platform. The various processing blocks and/or data flows depicted in FIG. 5 (and in the other drawing figures such as FIGS. 6-7) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, storage medium 410, and/or in the form of electronic circuitry.

In block 521, method 500 may include correlating a first set of items of threat information from the security information sharing platform. Referring back to FIG. 1, in some examples, correlation engine 121 may be responsible for implementing block 521.

In block 522, method 500 may include, responsive to determining that the correlated first set of items of threat information indicate a first malicious action type, creating a new security indicator comprising information from the correlated first set of items of threat information and associating the new security indicator with the first malicious action. Referring back to FIG. 1, in some examples, security indicator creation engine 122 may be responsible for implementing block 522.

In block 523, method 500 may include determining whether a first threat pattern exists based on the new threat. Referring back to FIG. 1, in some examples, threat pattern determination engine 123 may be responsible for implementing block 523.

Figure 6:
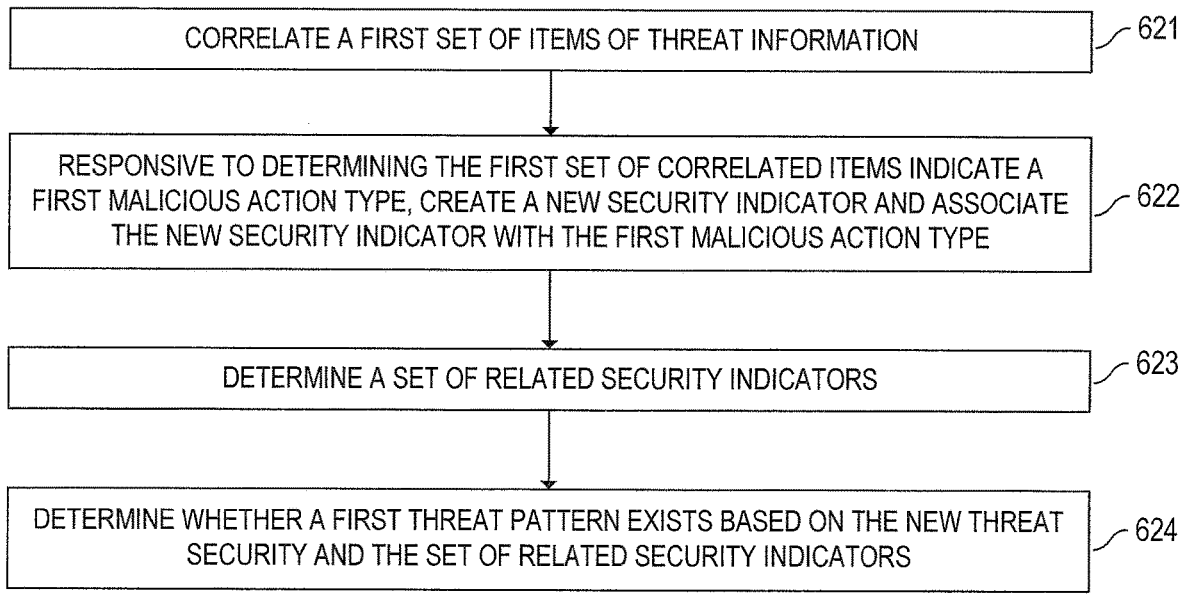
FIG. 6 is a flow diagram depicting an example method for providing enhanced intelligence on a security information sharing platform.

FIG. 6 is a flow diagram depicting an example method 600 for providing enhanced intelligence in a security information sharing platform. Method 600 as illustrated (and described in greater detail below) is meant to be an example and, as such, should not be viewed as limiting. Method 600 may be implemented in the form of executable instructions stored on a machine-readable storage medium, such as storage medium 210, storage medium 310, storage medium 410, and/or in the form of electronic circuitry.

In block 621, method 600 may include correlating a first set of items of threat information from the security information sharing platform. Referring back to FIG. 1, in some examples, correlation engine 121 may be responsible for implementing block 621. In some examples, referring back to FIG. 4, correlation instructions 421, when executed by processor 411, may be responsible for implementing block 621.

In block 622, method 600 may include creating a new security indicator comprising information from the correlated first set of items of threat information and associating the new security indicator with the first malicious action type, in response to determining that the correlated first set of items of threat information indicate a first malicious action type. Referring back to FIG. 1, in some examples, security indicator creation engine 122 may be responsible for implementing block 622. In some examples, referring back to FIG. 4, security indicator creation instructions 422, when executed by processor 411, may be responsible for implementing block 622.

In block 623, method 600 may include determining a set of related security indicators that are related to the new security indicator. Referring back to FIG. 1, in some examples, security indicator creation engine 122 may be responsible for implementing block 623. In some examples, referring back to FIG. 4, security indicator creation instructions 422, when executed by processor 411, may be responsible for implementing block 623.

In block 624, method 600 may include determining whether a first threat pattern exists based on the new security indicator and the set of related security indicators. Referring back to FIG. 1, in some examples, threat pattern determination engine 123 may be responsible for implementing block 624. In some examples, referring back to FIG. 4, threat pattern determination instructions 423, when executed by processor 411, may be responsible for implementing block 624.

Figure 7:
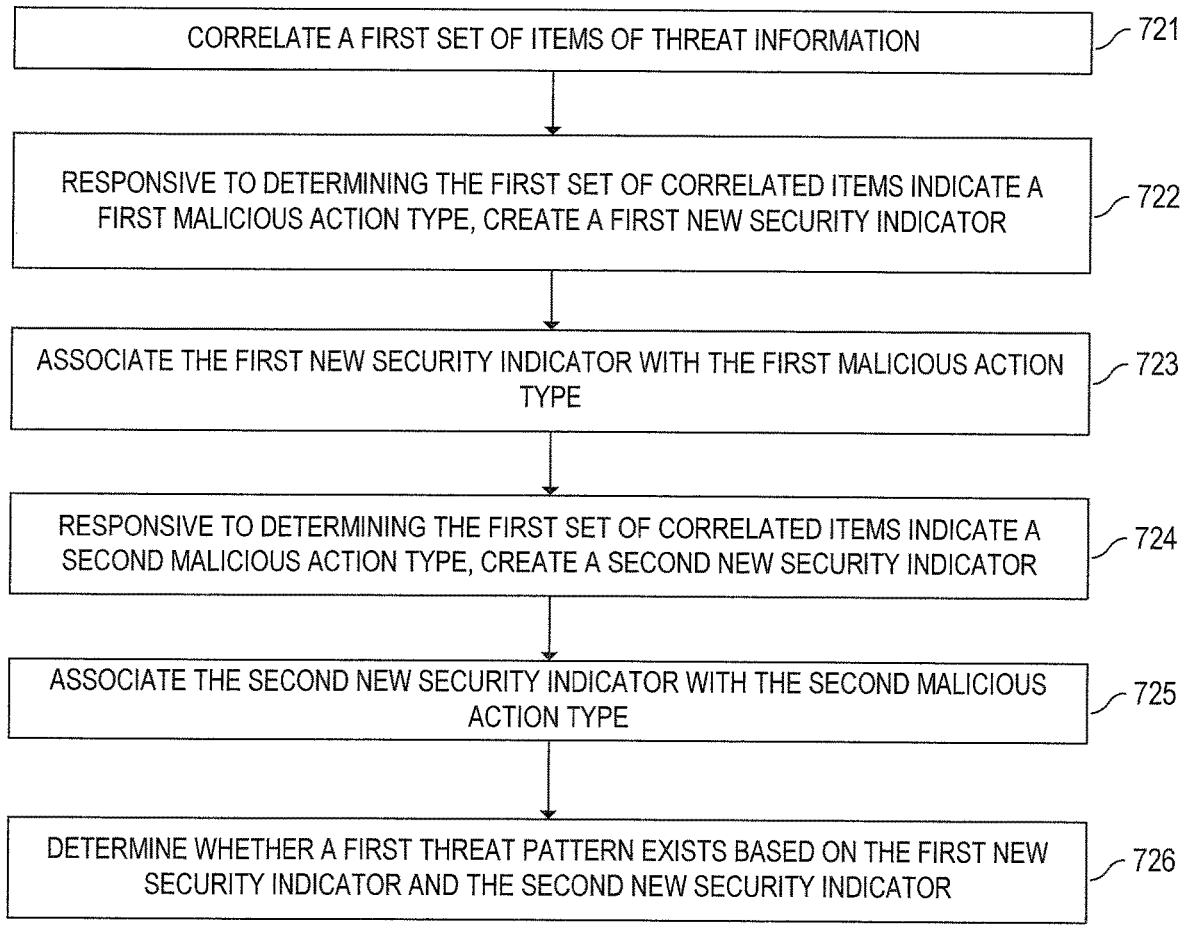
FIG. 7 is a flow diagram depicting an example method for providing enhanced intelligence on a security information sharing platform.

FIG. 7 is a flow diagram depicting an example method 600 for providing enhanced intelligence in a security information sharing platform. Method 600 as illustrated (and described in greater detail below) is meant to be an example and, as such, should not be viewed as limiting. Method 700 may be implemented in the form of executable instructions stored on a machine-readable storage medium, such as storage medium 210, storage medium 310, and/or in the form of electronic circuitry.

In block 721, method 700 may include correlating a first set of items of threat information from the security information sharing platform. Referring back to FIG. 1, in some examples, correlation engine 121 may be responsible for implementing block 721. In some examples, referring back to FIG. 4, correlation instructions 421, when executed by processor 411, may be responsible for implementing block 721.

In block 722, method 700 may include creating a first new security indicator comprising information from the correlated first set of items of threat information, in response to determining that the correlated first set of items of threat information indicate a first malicious action type. Referring back to FIG. 1, in some examples, security indicator creation engine 122 may be responsible for implementing block 722. In some examples, referring back to FIG. 4, security indicator creation instructions 422, when executed by processor 411, may be responsible for implementing block 722.

In block 723, method 700 may include associating first new security indicator with the first malicious action type. Referring back to FIG. 1, in some examples, security indicator creation engine 122 may be responsible for implementing block 723. In some examples, referring back to FIG. 4, security indicator creation instructions 422, when executed by processor 411, may be responsible for implementing block 723.

In block 724, method 700 may include creating a second new security indicator comprising information from the correlated first set of items of threat information, in response to determining that the correlated first set of items of threat information indicate a second malicious action type. Referring back to FIG. 1, in some examples, security indicator creation engine 122 may be responsible for implementing block 724. In some examples, referring back to FIG. 4, security indicator creation instructions 422, when executed by processor 411, may be responsible for implementing block 724.

In block 725, method 700 may include the second new security indicator with the second malicious action type. Referring back to FIG. 1, in some examples, security indicator creation engine 122 may be responsible for implementing block 725. In some examples, referring back to FIG. 4, security indicator creation instructions 422, when executed by processor 411, may be responsible for implementing block 725.

In block 726, method 600 may include determining whether a first threat pattern exists based on the first new security indicator and the second new security indicator. Referring back to FIG. 1, in some examples, threat pattern determination engine 123 may be responsible for implementing block 726. In some examples, referring back to FIG. 4, threat pattern determination instructions 423, when executed by processor 411, may be responsible for implementing block 726.

The foregoing disclosure describes a number of example implementations for providing enhanced intelligence in a security information sharing platform. The disclosed examples may include systems, devices, computer-readable storage media, and methods for providing enhanced intelligence in a security information sharing platform. For purposes of explanation, certain examples are described with reference to the components illustrated in FIGS. 1-7. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for providing enhanced threat intelligence in a security information sharing platform, the method being performed in a computer system comprising a physical processor implementing machine readable instructions, the method comprising:
   correlating, by the physical processor, a first set of items of threat information from the security information sharing platform;
   comparing the correlated first set of items of threat information to a stored plurality of action types in a data storage, wherein each action type of the stored plurality of action types comprises a unique identifier and a value indicating whether the action type is malicious or not malicious;
   responsive to determining that the correlated first set of items of threat information matches a first malicious action type of the stored plurality of action types:
      creating, by the physical processor, a new security indicator comprising a unique identifier of the first malicious action type and information from the correlated first set of items of threat information, and
      associating the new security indicator with the first malicious action type; and
   determining, by the physical processor, whether a first threat pattern exists based on the new security indicator.

2. The method of claim 1, wherein the first threat pattern comprises a first threat pattern set of security indicators, where each security indicator of the first threat pattern set of security indicators is associated with a corresponding malicious action type of the stored plurality of action types.

3. The method of claim 2, wherein determining whether the first threat pattern exists comprises:
   determining, by the physical processor, whether the security information sharing platform comprises a related set of security indicators, where each security indicator in the related set of security indicators matches a corresponding indicator in the first threat pattern set of security indicators.

4. The method of claim 1, further comprising:
   responsive to determining that the first threat pattern is associated with a remediation action, performing the remediation action.

5. The method of claim 1, further comprising:
   responsive to determining that the correlated first set of items of threat information do not match any malicious action type of the stored plurality of action types:
      creating, by the physical processor, a new whitelist indicator comprising information from the correlated first set of items of threat information; and
      associating, by the physical processor, the new whitelist indicator with a whitelist action type.

6. The method of claim 1, further comprising:
responsive to determining that the correlated first set of items of threat information match a second malicious action type of the stored plurality of action types:
creating, by the physical processor, a second new security indicator comprising a unique identifier of the second malicious action type and second information from the correlated first set of items of threat information, and
associating the second new security indicator with the second malicious action type; and
determining, by the physical processor, whether a second threat pattern exists based on a relationship between the second new security indicator and related security indicators in the security information sharing platform.

7. A system for providing enhanced intelligence on a security information sharing platform, the system comprising a physical processor that implements machine readable instructions that cause the system to:
correlate a first set of items of threat information from the security information sharing platform;
compare the correlated first set of items of threat information to a stored plurality of action types in a data storage, wherein each action type of the stored plurality of action types comprises a unique identifier and a value indicating whether the action type is malicious or not malicious;
responsive to determining that the correlated first set of items of threat information matches a first malicious action type of the stored plurality of action types:
create a new security indicator comprising a unique identifier of the first malicious action type and information from the correlated first set of items of threat information, and
associate the new security indicator with the first malicious action type;
determine a set of related security indicators that are related to the new security indicator; and
determine whether a first threat pattern exists based on the new security indicator and the set of related security indicators.

8. The system of claim 7, wherein the first threat pattern comprises a first threat pattern set of security indicators, where each security indicator of the first threat pattern set of security indicators is associated with a corresponding malicious action type of the stored plurality of action types.

9. The system of claim 8, wherein the physical processor causes the system to determine whether the first threat pattern exists by:
determining whether each security indicator in the set of related security indicators matches a corresponding indicator in the first threat pattern set of security indicators.

10. The system of claim 7, wherein the physical processor causes the system to:
determine the set of related security indicators from the correlated first set of items of threat information.

11. The system of claim 7, wherein the physical processor causes the system to:
determine whether the first threat pattern is associated with a remediation action;
responsive to determining that the first threat pattern is associated with the remediation action, perform the remediation action.

12. The system of claim 7, wherein the physical processor causes the system to:
responsive to determining that the correlated first set of items of threat information do not match any malicious action type of the stored plurality of action types:
create a new whitelist indicator comprising information from the correlated first set of items of threat information; and
associate the new whitelist indicator with a whitelist action type.

13. The system of claim 7, wherein the physical processor causes the system to:
responsive to determining that the correlated first set of items of threat information match a second malicious action type of the stored plurality of action types:
create a second new security indicator comprising a unique identifier of the second malicious action type and second information from the correlated first set of items of threat information, and
associate the second new security indicator with the second malicious action type; and
determine whether a second threat pattern exists based on the second new security indicator.

14. A non-transitory machine-readable storage medium encoded with instructions executable by a physical processor for providing enhanced intelligence on a security information sharing platform, the non-transitory machine-readable storage medium comprising instructions to:
correlate a first set of items of threat information from the security information sharing platform;
compare the correlated first set of items of threat information to a stored plurality of action types in a data storage, wherein each action type of the stored plurality of action types comprises a unique identifier and a value indicating whether the action type is malicious or not malicious;
responsive to determining that the correlated first set of items of threat information matches a first malicious action type of the stored plurality of action types, create a first new security indicator comprising a unique identifier of the first malicious action type and information from the correlated first set of items of threat information;
associate the first new security indicator with the first malicious action type;
responsive to determining that the correlated first set of items of threat information matches a second malicious action type of the stored plurality of action types, create a second new security indicator comprising a unique identifier of the second malicious action type and information from the correlated first set of items of threat information;
associate the second new security indicator with the second malicious action type; and
determine whether a first threat pattern of security indicators exists based on the first new security indicator and the second new security indicator.

15. The non-transitory machine-readable storage medium of claim 14, wherein the first threat pattern comprises a first threat pattern set of security indicators, where each security indicator of the first threat pattern set of security indicators is associated with a corresponding malicious action type of the stored plurality of action types.

16. The non-transitory machine-readable storage medium of claim 14, wherein the non-transitory machine-readable storage medium comprises instructions to determine whether the first threat pattern exists by:

determining a related set of security indicators, wherein the related set of security indicators comprises the first new security indicator and the second new security indicator; and determining whether each security indicator in the related set of security indicators matches a corresponding indicator in the first threat pattern set of security indicators.

17. The non-transitory machine-readable storage medium of claim 14, wherein the non-transitory machine-readable storage medium comprises instructions to:

determine whether the first threat pattern is associated with a remediation action;

responsive to determining that the first threat pattern is associated with the remediation action, perform the remediation action.

18. The non-transitory machine-readable storage medium of claim 14, wherein the non-transitory machine-readable storage medium comprises instructions to:

responsive to determining that the correlated first set of items of threat information do not match any malicious action type of the stored plurality of action types:

create a new whitelist indicator comprising information from the correlated first set of items of threat information; and associate the new whitelist indicator with a whitelist action type.

19. The system of claim 7, wherein the physical processor causes the system to:

correlate a second set of items of threat information from the security information sharing platform;

responsive to determining that the correlated second set of items of threat information indicate a content delivery network type, create a second new security indicator that indicates a content delivery network.

20. The system of claim 19, wherein the physical processor causes the system to:

determine that the correlated second set of items of threat information indicate the content delivery network type in response to:

a determination that multiple universal resource locators (URLs) point to files stored on a same domain, and a determination that host IP addresses are correlated to a known content delivery network.

* * * * *